United States Patent [19]

Reick

[11] 3,976,572

[45] Aug. 24, 1976

[54] AIRCRAFT FUEL CONTAMINANT TESTER

[75] Inventor: Franklin G. Reick, Westwood, N.J.

[73] Assignee: Michael Ebert, Mamaroneck, N.Y.; a part interest

[22] Filed: Jan. 8, 1975

[21] Appl. No.: 539,528

Related U.S. Application Data

[63] Continuation-in-part of Ser. No. 430,621, Jan. 4, 1974, Pat. No. 3,931,428.

[52] U.S. Cl. .............................. 210/94; 23/230 HC; 23/259; 73/61 R; 73/61.1 R; 210/23 R; 210/321 R; 210/172; 210/500 M
[51] Int. Cl.² .................... B01D 39/16; B01D 13/00
[58] Field of Search ...................... 23/230 HC, 259; 73/61 R, 61.1 R; 210/23 R, 94, 172, 321 R, 447, 459, 500 M; 428/241, 272, 283, 290

[56] References Cited
UNITED STATES PATENTS

| | | | |
|---|---|---|---|
| 2,611,490 | 9/1952 | Robinson | 210/23 R |
| 2,960,234 | 11/1960 | Fredrickson | 73/61.1 R |
| 2,970,468 | 2/1961 | Price | 210/23 R |
| 3,010,583 | 11/1961 | Kenyon | 73/61 R |
| 3,287,961 | 11/1966 | Dwyer | 73/61.1 R |
| 3,503,250 | 3/1970 | Cotton et al. | 73/61 R |
| 3,810,775 | 5/1974 | Uhl et al. | 428/290 X |
| 3,814,079 | 6/1975 | Le Roy, Sr. | 23/259 X |
| 3,873,271 | 3/1975 | Young et al. | 23/259 X |

*Primary Examiner*—Thomas G. Wyse
*Assistant Examiner*—Robert G. Mukai

[57] ABSTRACT

A test unit for indicating the presence of water and other contaminants in aircraft fuel. The unit is constituted by a transparent cylinder closed at its bottom and having a filter element therein which divides the cylinder into an upper chamber and a lower chamber. Mounted at the top end of the cylinder and projecting therefrom is a valve-actuating pin adapted to engage the sump drain valve in the fuel tank to be tested to cause a fuel sample to flow into the upper chamber. The filter element is formed of a selectively-permeable hydrophobic material which blocks the flow of water and other contaminants and is permeable only to the fuel whereby should the fuel contain contaminants, the pure fuel will pass into the lower chamber and the contaminants will be retained in the upper chamber.

9 Claims, 4 Drawing Figures

U.S. Patent   Aug. 24, 1976   3,976,572
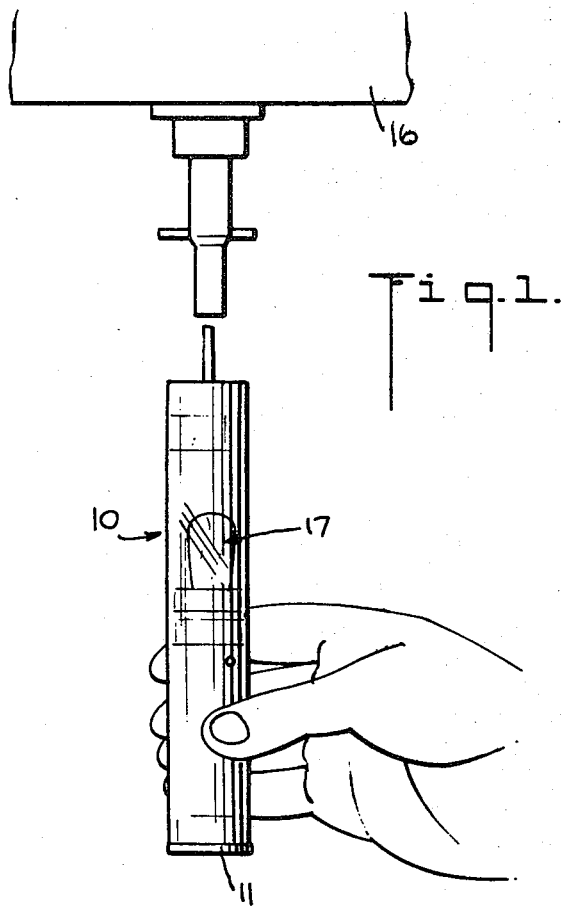
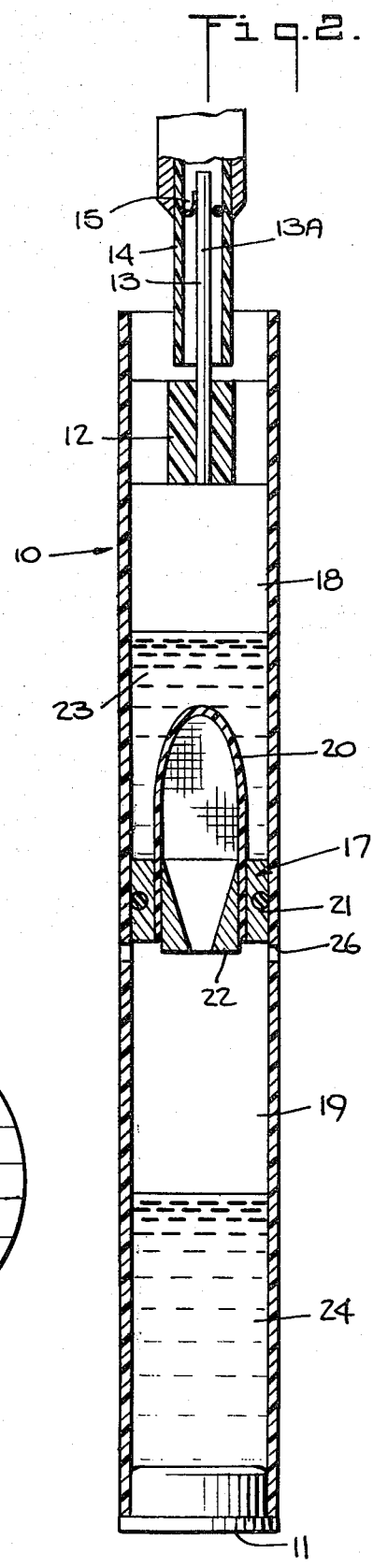
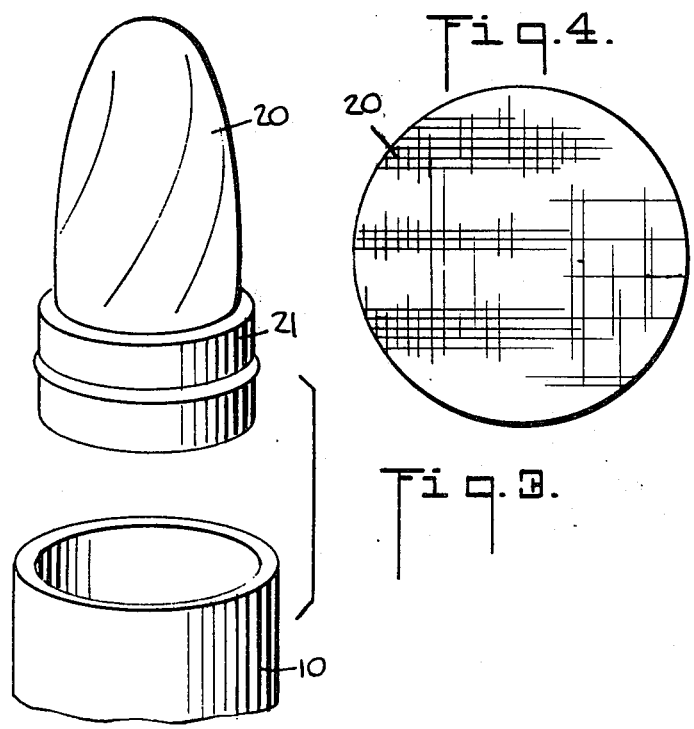
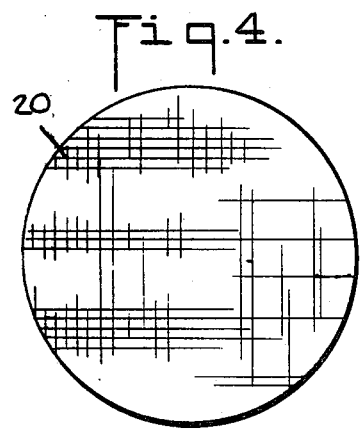

AIRCRAFT FUEL CONTAMINANT TESTER

RELATED APPLICATION

This application is a continuation-in-part of the copending application, Ser. No. 430,621, filed Jan. 4, 1974, entitled "Substrate Coated with Super-Hydrophobic Layers," said copending application, whose entire disclosure is incorporated herein by reference, now issued as U.S. Pat. No. 3,931,428 (Jan. 6, 1976).

BACKGROUND OF INVENTION

This invention relates generally to the testing of aircraft fuel for contaminants, and more particularly to a test unit which separates the fuel from the contaminant whereby the presence of the latter is positively indicated.

As noted in the Advisory Circular (20–43B), published June 8, 1971 by the Federal Aviation Administration of the Department of Transportation, the existence of any contaminant in aircraft fuel is dangerous. Fuel is said to be contaminated when it contains substances that are not called for in the fuel specification. In general, these substances are water, rust, sand and other foreign matter.

All aviation fuel absorb moisture from the air and include water in both dissolved and liquid form. The amount of dissolved water contained in the fuel depends on the fuel temperature. Whenever the temperature is decreased some of the dissolved water comes out of solution and slowly falls to the bottom of the fuel tank. With an increase in fuel temperature, water is then drawn from the atmosphere to maintain a saturated solution. Thus changes in fuel temperature give rise to a continuous accumulation of water. When the fuel system in a plane is subjected to freezing temperatures, this water may turn to ice and restrict or arrest the flow of fuel.

Rust in the fuel is produced in pipelines, storage tanks and in fuel trucks which handle the fuel. Because such rust is found in fine particle sizes, a high degree of filtration is necessary to remove the rust constituent from the fuel. As to dust and sand, these contaminants enter through openings in the tank or result from the use of dirty fuel-handling equipment.

As a practical matter, the total elimination of contaminants from aviation fuel is not possible. Thus one effective way of preventing water contamination is to fill the fuel tank completely at the end of each flight, thereby avoiding condensation of water on the walls of a partially-filled tank. But this post-flight procedure is usually not feasible under prevailing conditions. Hence the present practice is to carefully test for contaminants before flight.

Preflight testing, as presently carried out, involves draining a generous sample of fuel into a transparent container from each of the fuel sumps and from the main fuel strainer or gascolator. The fuel samples are then examined for dirt and water. If contaminants are present, they will collect at the bottom of the container. Since the fuel has a distinctive color, the difference between the layer of fuel in the container and the water and dirt therebelow should be readily evident. When contamination is detected in a given sump, fuel is repeatedly drained therefrom and tested in the container until the system appears to be clear of all water and dirt.

The difficulty with the existing preflight procedure to test for fuel contaminants is that it is not entirely effective under poor conditions of illumination when it is difficult to discern the difference in color between the fuel dye and the water. Moreover, if the water contains rust or other material imparting some color thereto, the distinction between the color of the water and the color of the fuel may become less pronounced.

Another factor that must be taken into account is that while fuels are color-coded in accordance with their octane content, should fuels be mixed, as is sometimes the case, the resultant color may approach a neutral value. Thus 80/87 octane has a red dye added thereto, 91/96 octane has a blue dye added thereto, 100/130 octane is green and 115/145 octane is purple. But the mixture of any two of these fuels may result in a much less distinctive color whose value may be difficult to distinguish from dirty water.

Hence the existing procedure in which the contaminants and the fuel mingle in the same container and are distinguishable from each other only in terms of color contrast, is lacking in reliability and does not afford an unmistakable, positive indication of the presence of contaminants.

SUMMARY OF INVENTION

In view of the foregoing, the main object of this invention is to provide a test unit which positively indicates the presence of water and other contaminants in aircraft fuel without regard to color contrast therebetween, whereby the existence of such contaminants is made evident even under poor light conditions.

More specifically, it is an object of this invention to provide a test unit in which contaminants contained in a fuel sample are segregated from the pure fuel to afford an unmistakable indication thereof.

Also an object of this invention is to provide a low-cost test unit which is reliable and efficient in operation and which makes it possible to repeatedly test for the presence of contaminants at a rapid rate whereby a fuel system may be quickly checked and cleared of contaminants.

Briefly stated, these objects are attained in a contaminant test unit constituted by a transparent cylinder having a removable closure at its bottom and a valve-actuating pin mounted at its open top and projecting upwardly therefrom, the pin being adapted to engage the sump-drain valve in the fuel tank to be tested so that a fuel sample may be caused to flow into the cylinder.

The cylinder is divided into an upper chamber and a lower chamber by a selectively-permeable filter element having super-hydrophobic properties. Thus when a sample of the fuel is taken, the filter element which is permeable only to fuel, passes the fuel into the lower chamber and blocks the flow of the contaminants which are collected in the upper chamber, thereby positively indicating the presence of the contaminants.

After each test, the closure is removed to quickly drain the fuel from the lower chamber, and the cylinder is turned over to drain the contaminants from the open top, thereby making it possible to rapidly and repeatedly test the fuel system in order to clear the system of all contaminants.

OUTLINE OF DRAWING

For a better understanding of the invention as well as other objects and further features thereof, reference is made to the following detailed description to be read in conjunction with the accompanying drawing, wherein:

FIG. 1 illustrates, in perspective, a fuel contaminant test unit in accordance with the invention as it operates in conjunction with the drain valve of an aircraft fuel tank;

FIG. 2 is a longitudinal section taken through the unit;

FIG. 3 separately shows the filter element of the unit; and

FIG. 4 is a plan view of the filter sheet material before it is twisted into plug form.

DESCRIPTION OF INVENTION

Referring now to the drawing, there is shown a test unit in accordance with the invention, the unit including a cylinder 10 of transparent plastic material such as an acrylic whose bottom is closed by a removable plastic stopper 11.

Anchored at the open top of cylinder 10 by means of a thwart piece 12 is a valve-actuating metal pin 13 having a longitudinal groove 13A formed therein to prove a flow passage. The pin projects upwardly from cylinder 10. When, as shown in FIG. 2, the tip of the pin is inserted into the valve tube 14 extending below the sump 16 of a fuel tank and engages the valve flap 15, the valve is opened and a sample of fuel is caused to flow into the test unit cylinder along the groove.

Cylinder 10 is divided by a filter element, generally designated by numeral 17, into an upper chamber 18 and a lower chamber 19. The filter element is constituted by a hollow conical plug 20 whose base is held within a collar 21 by a funnel 22, the periphery of the collar being bonded to the inner surface of the cylinder.

The plug is created by a disc-shaped piece of super-hydrophobic material which is twisted into a plug formation in order to provide within upper chamber 18 a coaxially-disposed filter having a large surface area. This increased surface area is desirable in that it avoids the possibility that a clot of water in the sample taken from the tank may block all flow in the unit. Had a planar filter been used to divide the cylinder into an upper and lower chamber, this clot might coat the entire filter surface and prevent further flow, whereas with a cone, a portion thereof would remain exposed above the clot to pass the gasoline.

Filter 20 is preferably of the type set forth in the above-identified copending application wherein a super-hydrophobic material is disclosed, which material is formed by a substrate having a micro-rough face coated with hydrophobic fumed silicon dioxide particles which are bonded to the face by a binder also having hydrophobic properties.

In order to provide a selectively-permeable filter to separate aircraft fuel from water and contaminants such as rust and dust suspended in water, use is preferably made of a substrate in the form of a porous nonwoven material such as "Tyvek" or "Reemay" manufactured by DuPont.

Tyvek is a spunbonded material formed of polyethylene fibers which are densely packed to produce a porous body that has a very fine fuzz or uncut pile face that imparts thereto hydrophobic properties. Similar characteristics are found in Reemay which is constituted by spunbonded polyester layers formed by continuous filament fibers that are randomly arranged and highly dispersed. These fibers are crimped to provide a fuzzy surface having a high degree of hydrophobicity.

The face of the Tyvek or Reemay substrate is coated with hydrophobic fumed silica particles dispersed in a solvent that is chemically hydrophobic, within which solvent is dissolved a resinous, plastic binder that is chemically hydrophobic. When the coating is dried or cured, all constituents thereof including trace elements are hydrophobic in character so that the resultant treated substrate is super-hydrophobic and highly resistant to abrasion and other damaging effects. Thus even when an area of the super-hydrophobic surfaces becomes eroded, the exposed area remains hydrophobic and in no instance is a hydrophilic area created because of wear.

One preferred solution for this purpose is prepared by dispersing 50 grams of QSO-WR82 (a coarse, precipitated silica treated with silanes to render it hydrophobic) in 500 cc of VMP naphtha, a standard paint solvent. QSO-WR82 is manufactured by the Philadelphia Quartz Company in a manner disclosed in U.S. Pat. No. 3,208,823.

The preparation of this solution is facilitated by placing the silica and solvent in a Waring blender and operating the blender for about a half minute to thoroughly intermingle the ingredients. Then another 500 cc of VMP naphtha is added to the mixture in the blender and a binder is introduced in the form of 25 cc of a 50% solution of silicone rubber (RT vulcanized), such as Silastic 734, manufactured by Dow Corning. The solution, after a thorough mixing action, is now ready to be applied to the plug. The disc from which the plug is formed is preferably at least one-sixteenth of an inch thick to ensure the absence of water leakage therethrough.

In practice, it is better to coat the substrate after it has been shaped into a hollow conical plug, so that the coating is not disturbed nor broken in the course of forming the plug. The preferred procedure for this purpose is to use a vacuum technique for drawing the coating solution onto the exposed surface of the formed plug.

The filter so formed is selectively permeable with respect to contaminated fuel, for it has philic characteristics relative to gasoline and quickly passes it through, whereas it is extremely phobic with respect to water despite its porosity. The filter blocks the passage of water and contaminants suspended therein.

Thus, as shown in FIG. 2, when a sample of the fuel is taken, the water 23 is retained in upper chamber 18 and the pure gasoline 24 collects in the lower chamber 19, so that there is no question as to the presence of contaminants, regardless of the color of the water and the gasoline. The lower chamber is provided with air holes 26 to exhaust the air from this chamber as it is filled with fuel.

Upon the completion of this test, stopper 11 is removed to drain the gasoline from the lower chamber and the cylinder is turned over to drain the water from the upper chamber, thereby emptying the unit in readiness for the next test. Should any rust or other foreign material become lodged on the surface of the plug, this material may readily be removed by flushing the plug through the lower chamber.

While there has been shown and described a preferred embodiment of an aircraft fuel contaminant tester, it will be appreciated that many changes and modifications may be made therein without, however, departing from the essential spirit thereof.

I claim:

1. A unit for visually testing fuel for the presence of water, said unit comprising a transparent cylinder whose bottom is closed and whose top is open, said cylinder being divided by a filter element into a transparent upper chamber and a transparent lower chamber, said lower chamber including a vent open to the atmosphere, said element being constituted by a selectively-permeable hydrophobic material which passes only the fuel component in a sample supplied to the upper chamber into the lower chamber where it is visible to an observer and completely blocks the passage of the water component contained in the sample so that the water is retained in the upper chamber where it is visible to the observer, whereby the presence of water is positively indicated.

2. A unit as set forth in claim 1, wherein said lower chamber is closed by a removable stopper.

3. A unit as set forth in claim 1, wherein said vent is an air hole adjacent said filter element to exhaust air therefrom as it is filled with fuel.

4. A unit as set forth in claim 1, wherein a pin is anchored at the top of said upper chamber and extends upwardly therefrom, said pin being adapted to actuate a fuel drain valve.

5. A unit as set forth in claim 1, wherein said filter element is constituted by a hollow conical plug extending into said upper chamber.

6. A unit as set forth in claim 1, wherein said filter material is formed of a porous substrate having a coating thereon of hydrophobic material.

7. A unit as set forth in claim 6, wherein said substrate is formed into a hollow plug whose surface is coated with said hydrophobic material.

8. A unit for visually testing fuel for the presence of water, said unit comprising a transparent cylinder whose bottom is closed and whose top is open, said cylinder being divided by a filter element into a transparent upper chamber and a transparent lower chamber, said lower chamber including a vent open to the atmosphere, said element being constituted by a selectively permeable hydrophobic material which passes only the fuel component in a sample supplied to the upper chamber into the lower chamber where it is visible to an observer and completely blocks the passage of the water component contained in the sample so that the water is retained in the upper chamber where it is visible to the observer, whereby the presence of water is positively indicated, said filter element being formed of a porous substrate constituted by nonwoven, spunbonded fibers selected from the class consisting of polyethylene and polyester fibers, said fibers having a hydrophobic coating therein which includes fumed silicon dioxide particles.

9. A unit as set forth in claim 8, wherein said particles are bonded to said substrate by a silicon rubber binder.

* * * * *